United States Patent [19]

Huchler et al.

[11] 4,259,531

[45] Mar. 31, 1981

[54] POLYMERIZATION OF TETRAHYDROFURAN TO PREPARE POLYTETRAMETHYLENE ETHER GLYCOLS

[75] Inventors: Otto H. Huchler, Limburgerhof; Walter Mesch, Ludwigshafen; Siegfried Winderl, Heidelberg-Wieblingen; Herbert Mueller; Herwig Hoffmann, both of Frankenthal, all of Fed. Rep. of Germany

[73] Assignee: BASF Aktiengesellschaft, Fed. Rep. of Germany

[21] Appl. No.: 969,712

[22] Filed: Dec. 15, 1978

Related U.S. Application Data

[63] Continuation of Ser. No. 812,619, Jul. 5, 1977, abandoned, which is a continuation of Ser. No. 612,019, Sep. 10, 1975, abandoned.

[30] Foreign Application Priority Data

Sep. 26, 1974 [DE] Fed. Rep. of Germany ..... 24459618

[51] Int. Cl.$^3$ ............... C07C 41/01; C07C 41/26; C07C 43/13
[52] U.S. Cl. ............... 568/617; 260/410.6; 560/91; 560/93; 560/112; 560/200; 560/240
[58] Field of Search ............... 560/240, 93, 91, 112, 560/200; 568/617; 260/410.6

[56] References Cited

U.S. PATENT DOCUMENTS

| | | | |
|---|---|---|---|
| 2,499,725 | 3/1950 | Copelin | 560/240 |
| 2,691,038 | 10/1954 | Englehardt | 560/240 |
| 3,720,719 | 3/1973 | Matsuda et al. | 568/617 |
| 3,720,719 | 7/1969 | Dunlop et al. | 568/617 |

FOREIGN PATENT DOCUMENTS

898269  4/1945  France .

*Primary Examiner*—Vivian Garner
*Attorney, Agent, or Firm*—Keil & Witherspoon

[57] ABSTRACT

Polytetramethylene ether glycols with molecular weights of from 300 to 4500 are produced by polymerizing tetrahydrofuran with an adduct of antimony pentachloride with carboxylic acids or carboxylic acid esters as the catalyst in the presence of a carboxylic acid anhydride, e.g., acetic anhydride, as the promoter. Esterified, e.g., acetylated, polytetramethylene ether glycols produced are subsequently converted to polytetramethylene ether glycols by saponification or transesterification. The process causes substantially less environmental pollution than do prior art methods, yet it is both economical and flexible.

5 Claims, No Drawings

POLYMERIZATION OF TETRAHYDROFURAN TO PREPARE POLYTETRAMETHYLENE ETHER GLYCOLS

This is a continuation of application Ser. No. 812,619, filed July 5, 1977, which is in turn a continuation of application Ser. No. 612,019, filed Sept. 10, 1975, both now abandoned.

The present invention relates to a process for the polymerization of tetrahydrofuran with antimony pentachloride as the catalyst in the presence of a carboxylic acid and/or carboxylic acid anhydride as the promoter.

The polymerization of tetrahydrofuran (THF) with oxonium ions as catalyst has been disclosed by the fundamental work of H. Meerwein et al. (Angew. Chem. 72 (1960), 927).

The catalysts employed are either compounds formed beforehand or compounds produced in situ. For example, the following previously formed trialkyloxonium salts have been disclosed as catalysts:

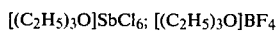

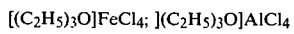

Suitable components which form oxonium ions in the reaction medium are, above all, Lewis acids, eg. $BF_3$, $AlCl_3$, $SnCl_4$, $SbCl_5$, $FeCl_3$ or $PF_5$, which may be employed together with ethylene oxide, propylene oxide, epichlorohydrin, orthoesters and acetals, α-chloroethers, benzyl chloride, triphenylmethyl chloride, acetyl chloride or β-propiolactone, and inorganic protonic acids, such as $HClO_4$, $HBF_4$, $HSO_3F$, $HSO_3Cl$, $H_2SnCl_6$, $HIO_3$, $HSbCl_6$ or $HFeCl_4$, which may be employed together with carboxylic acid anhydrides, carboxylic acid chlorides, $SOCl_2$, $POCl_3$ and benzenesulfonic acid chloride, and also more recently, aluminum-alkyl compounds in combination with epichlorohydrin or water. This list, which in no way claims to be complete and only mentions the most important systems hitherto disclosed, clearly shows that there is a great diversity of catalysts by means of which polytetrahydrofuran (PTHF) can be manufactured. However, only a few of the catalysts have become important in industry, since only they permit the manufacture of polymers which in chemical and physical properties meet the market requirements.

Hence, even those skilled in the art are not able to select an optimum catalyst on the basis of what has been disclosed. The catalyst currently used in the art are derived from $BF_3$, $FSO_3H$ and $HClO_4$, and in addition olefin oxides, acetyl chloride, acetic anhydride and ketene may be used as promoters. However, these processes generally suffer from the shortcoming that the so-called catalysts do not act catalytically in the strict sense and instead have to be employed in the stoichiometric ratio to the macromolecule produced. Accordingly, at least one catalyst molecule is consumed per molecule of polytetrahydrofuran (PTHF) produced. This causes the manufacture of PTHF not only to be expensive but also to produce considerable pollution of the environment. For example, U.S. Pat. No. 3,358,042 discloses a process in which about two molecules of $HSO_3F$ must be employed as the catalyst per molecule of PTHF. The polymer first obtained must then be worked up by hydrolysis to convert it to a catalyst-free polyether-diol. Following this step, the catalyst appears quantitatively in the effluent, as NaF and $Na_2SO_4$. To manufacture 100 parts of polymer, 30 to 40 parts of salt waste must be coped with.

It is an object of the invention to provide a polymerization process which produces less pollution of the environment, is inexpensive and is at the same time sufficiently flexible that the molecular weight range required in practice, which generally is from 300 to 4,500 and preferably from 500 to 3,000, can be covered without gaps. It is a further object to convert the primary polymer into an α,ω-polyether-diol without major expense.

We have found that these objects are achieved by a process for the polymerization of tetrahydrofuran with antimony pentachloride as the catalyst, wherein the polymerization is carried out in the presence of at least one carboxylic acid and/or at least one carboxylic acid anhydride.

The antimony pentachloride catalyst employed in the process according to the invention may be technical-grade $SbCl_5$, obtained, eg., by chlorination of $SbCl_3$.

Meerwein [Angew, Chem. 72, 927 (1960)] disclosed that antimony pentachloride, without further additive, was a very effective catalyst which rapidly initiated the polymerization even when used at very low concentration. However, it is a disadvantage that products of very high molecular weight (greater than 5,000) are formed, which are unusable for the main application of PTHF, in the polyurethane resin sector. A modification of the catalyst system by adding acetyl chloride has also been disclosed. The polymers manufactured in this way, however, contain chlorine which is difficult to saponify and are for this reason unusable in practice. The use of carboxylic acids and carboxylic acid anhydrides in combination with $SbCl_5$ has not yet been disclosed. Rather, the teaching consensus is that only Lewis acids in combination with acid chlorides give sufficiently stable carbonium compounds which are capable of polymerizing THF (cf. Advan. Polymer Science, 4 (1967), 544).

In a particularly preferred embodiment of the process according to the invention, the carboxylic acid used is a monocarboxylic acid of at least two carbon atoms, the carboxylic acid anhydride used is the anhydride of a monocarboxylic acid or dicarboxylic acid of two to four carbon atoms, and the polymerization is carried out at from 0° to 70° C.

The polymerization carried out according to the invention may be stopped by adding water, an alcohol or a basic compound and the catalyst may then be removed by conventional methods.

It was surprising and unforeseeable that amongst the plurality of possibilities it would be the combination of $SbCl_5$ and a carboxylic acid and/or carboxylic acid anhydride which ideally meets the requirements of an industrial process for the polymerization of THF. The element of surprise is accentuated by the fact that the combination of $SbCl_5$ with other known promoters, eg. olefin oxides, epichlorohydrin, α-chloroethers, benzyl chloride, thionyl chloride or lactones, in no way gives satisfactory results.

In the process of the invention, only very small amounts of antimony pentachloride are required for the polymerization. Since the molecular weight depends very greatly on the amount of antimony employed, the catalyst must be metered very accurately. Furthermore $SbCl_5$ is a very sensitive compound which, when exposed to the atmosphere, fumes copiously, with liberation of HCl. At the same time, insoluble solids are produced in the liquid and these make metering difficult.

The catalyst can be metered with less effort if, instead of pure SbCl$_5$, addition compounds with carboxylic acids or their esters are used, in which case the antimony pentachloride is preferably employed in solution in a carboxylic acid and/or a carboxylic acid ester. Addition compounds of antimony pentachloride with carboxylic acids are preferred. These adducts were described by A. Rosenheim and W. Loewenstamm (Ber. 35 (1901), 1,115). Monobasic acids form 1:1 adducts and dibasic acids form 2:1 adducts.

Carboxylic acids and carboxylic acid esters suitable for this purpose are, e.g., those of 1 to 10, preferably of 2 to 6, carbon atoms, eg. aliphatic monocarboxylic acids, such as valeric acid, trimethylacetic acid, caproic acid, heptylic acid, caprylic acid, pelargonic acid, methylethylcaproic acid and, preferably, formic acid, acetic acid, propionic acid and 2-ethylhexanoic acid; aliphatic dicarboxylic acids, such as maleic acid, glutaric acid, adipic acid, and, preferably, oxalic acid and succinic acid, and aromatic monocarboxylic acids and dicarboxylic acids, such as benzoic acid, terephthalic acid and phthalic acid, and their esters with monohydric or polyhydric alcohols, eg. methanol, ethanol and 1,4-butanediol. Suitable compounds are produced by mixing a carboxylic acid or carboxylic acid ester and antimony pentachloride in the presence or absence of a solvent, whereupon an exothermic reaction ensues. The adducts need not be used in the pure form; rather, it is simplest to employ them as solutions. In a preferred embodiment of the new process, carboxylic acids themselves are used as solvents. The solvents may in that case contain, eg., from 0.5 to 80 percent by weight of the adduct. It is surprising that it is not detrimental to the polymerization to introduce substantial amounts of acid into the polymerization batch together with the antimony compound. According to the invention, it is in general possible to employ from 0.5 to 10, preferably from 1 to 5, percent by weight of carboxylic acid or carboxylic acid ester per 100 parts of THF.

Surprisingly, it is even possible to add the starting compounds for the adducts, ie. the carboxylic acid or carboxylic acid ester and the SbCl$_5$, separately to the THF, so that the formation of the compound can take place in the latter. It is known that cationic polymerizations are very sensitive to impurities, eg. acids. This is particularly true of the polymerization of THF (cf. P. Dreyfuss and M. P. Dreyfuss in Advan. Polymer Science, Vol. 4, p. 546, 2nd paragraph). Contrary to general experience, however, the carboxylic acids have even proved to be suitable promoters in the process according to the invention, so that the acid anhydrides may be replaced entirely or partially by carboxylic acids. When using acid anhydrides as promoters it is expedient to use, as catalysts, adducts which are derived from the same carboxylic acids as the anhydrides themselves, though this is not essential. Thus it is also possible, eg., to use mixtures of acids or anhydrides instead of the pure carboxylic acids or anhydrides. Some of the possible adducts suitable for use as catalysts are:

CH$_3$.COOH. SbCl$_5$; CH$_3$.COOC$_2$H$_5$. SbCl$_5$

C$_2$H$_5$.COOH. SbCl$_5$; C$_6$H$_5$.COOH.SbCl$_5$

C$_6$H$_5$.CH$_2$COOH. SbCl$_5$; C$_6$H$_4$(COOH)$_2$. [SbCl$_5$]$_2$

C$_2$(OOH)$_2$. [SbCl$_5$]$_2$; C$_2$H$_4$.(COOH)$_2$. [SbCl$_5$]$_2$

Technical-grade SbCl$_5$ may, for example, be used for the manufacture of the catalyst complex. The concentration in which SbCl$_5$ in combination with the carboxylic acid or carboxylic acid anhydride becomes catalytically active is remarkably low. Reaction rates adequate for the industrial manufacture of PTHF, ie. conversions of from 20 to 60% in a few hours, are achieved even with SbCl$_5$ concentrations of less than 0.01 percent by weight in the reaction mixture. Since, at extremely low catalyst concentrations, technical-grade THF must be specially freed from trace impurities and moisture, the polymerization will in general be carried out at concentrations of from 0.02 to 0.2 percent by weight. The use of larger amounts of catalyst is feasible but is economically undesirable.

The catalyst concentration greatly influences the degree of polymerization. The latter is, as a first approximation, inversely proportional to the SbCl$_5$ concentration in the polymerization batch. It thus approximately conforms to the following law, within the desired molecular weight range of from 300 to 4,500.

$$\text{Molecular Weight} = \text{Constant}/\text{SbCl}_5$$

Further parameters through which the degree of polymerization can be influenced as desired are the concentration of the carboxylic acid or of the carboxylic acid anhydride and the polymerization temperature. Here again the molecular weight drops as the concentration or the temperature is increased.

Suitable promoters are, in addition to the carboxylic acids already mentioned, in principle all carboxylic acid anhydrides, especially those derived from carboxylic acids of 2 to 10 carbon atoms, eg. monocarboxylic acid anhydrides such as acetic anhydride, propionic anhydride and butyric anhydride, polycarboxylic acid anhydrides and especially dicarboxylic acid anhydrides, preferably those of 2 to 12 carbon atoms, eg. succinic anhydride and maleic anhydride. For reasons of accessibility and price, acetic anhydride is preferred. Mixed anhydrides may also be used.

The amount of carboxylic acid anhydride to be used depends on the desired degree of polymerization. Since the reaction temperature also influences the molecular weight, the amount of anhydride used also depends on the temperature. For the desired molecular weight range of from 300 to 4,500 the anhydride concentration is in general from 1 to 20 mole percent at reaction temperatures of from 20° to 70° C. However, values above or below these limits are admissible without presenting difficulties.

The upper limit imposed on the reaction temperature is the "ceiling temperature", which is about 85° C. The lower limit is decided by economic considerations depending on available inexpensive means of cooling. In general, the polymerization is carried out at from 0° to 70° C., preferably at from 20° to 65° C.

After the polymerization has taken place, the reaction is stopped by addition of alcohols, eg. methanol, ethanol or butanol, water or basic compounds, eg. sodium carbonate, calcium hydroxide, potassium bicarbonate or sodium hydroxide. Preferably, calcium hydroxide is used for this purpose. This latter measure, which is also a subject of the present invention, offers the advantage that, totally unexpectedly, the antimony catalyst is irreversibly precipitated by an unknown mechanism and may, eg., be removed from the product by simple filtration. Accordingly, expensive purification of the polymer to remove antimony, by washing with water, is made unnecessary. The polymer, containing acetyl groups, which has been freed from the catalyst, can then be converted to a polytetramethylene ether glycol by the conventional methods of saponification.

The Examples which follow illustrate the invention without in any way limiting it.

In the Examples, parts and percentages are by weight, unless stated otherwise.

EXAMPLE 1

360 parts of dried THF (water content <0.01%) are heated to 60° C. and 10 parts of acetic anhydride and 0.29 part of antimony pentachloride are added successively, whilst stirring. After 4 hours' polymerization, 5 parts of calcium hydroxide powder are added to the viscous solution and the batch is stirred for a further hour. Suspended hydroxide, to which the antimony catalyst is bound, is then removed from the reaction product by filtration under pressure. The clear solution is then freed from excess THF under reduced pressure. 190 parts of acetylated polytetramethylene glycol of molecular weight, determined by vapor pressure osmometry, of 1,850 are obtained. The saponification number of the product was found to be 59 mg of KOH/g. The product may be converted into a polyether gylcol by the conventional methods of acid or alkaline saponification or trans-esterification.

A similar result to that described is obtained if the acetic anhydride is replaced by the equivalent amount of butyric anhydride. A polyether glycol esterified at both ends by butyric acid is obtained.

EXAMPLE 2

The procedure followed is as described in Example 1, at 60° C., using a constant amount of 0.1 part of $SbCl_5$ per 72 parts of tetrahydrofuran, but with varying amounts of acetic anhydride. The table which follows shows the results:

| Experiment No. | Acetic anhydride | Conversion | Molecular weight determined from saponification number | Saponification number mg of KOH/g |
| --- | --- | --- | --- | --- |
| 1 | 2 | 47 | 1,908 | 59 |
| 2 | 4 | 53 | 1,570 | 71 |
| 3 | 8 | 51 | 1,210 | 93 |
| 4 | 12 | 55 | 820 | 137 |

EXAMPLE 3

The procedure followed is as described in Example 1 except that the polymerization is carried out at 25° C., with 60 parts of acetic anhydride added. 50% conversion is obtained and a polymer of molecular weight 1,700 (determined by vapor pressure osmometry), and having a saponification number of 66, is isolated.

EXAMPLE 4

A solution of the catalyst complex ($CH_3COOH \cdot SbCl_5$) in glacial acetic acid is prepared by mixing 25 parts of glacial acetic acid and 20 parts of $SbCl_5$ at 30° C. (whilst cooling). 61 Parts of acetic anhydride and 4 parts of the above solution of the $SbCl_5$ complex are then added successively to 2,160 parts of tetrahydrofuran at 60° C. The polymerization is allowed to take place for 4 hours at 60° C., 2 parts of $Ca(OH)_2$ and 2 parts of active charcoal are then added and the mixture is stirred for a further hour at 60° C. The solids are removed from the viscous colorless solution by filtration under pressure. Unconverted THF and acetic anhydride are distilled off; 700 parts of a polymer containing acetyl groups and having a molecular weight of 2,000 are obtained. The saponification number is 56 mg of KOH/g. The product is free from catalyst residues.

Similar results are obtained if, in preparing the catalyst complex, acetic acid is replaced by the equivalent amount of propionic acid or isobutyric acid.

EXAMPLE 5

50 parts of glacial acetic acid and 3 parts of $SbCl_5$ are mixed at room temperature. 14 parts of this solution are added, as the polymerization catalyst, to 360 parts of tetrahydrofuran. The polymerization is allowed to take place for 4 hours at 25° C. and the batch is then worked up as in Example 1. 100 parts of polytetrahydrofuran of molecular weight 2,200 are obtained. Saponification with methanolic sodium methylate by conventional methods gives a polytetramethylene ether glycol having a hydroxyl number of 50 mg of KOH/g.

We claim:

1. In the process for preparing polytetramethylene ether glycols of molecular weights of about 300 to 4500, wherein tetrahydrofuran is polymerized in the presence of a catalyst and a promoter and esterified polytetramethylene ether glycols produced are converted to polytetramethylene ether glycols by saponification or transesterification, the improvement comprising:
    (a) using as said catalyst an adduct of antimony pentachloride with carboxylic acids or carboxylic acid esters having 1 to 10 carbon atoms selected from the group consisting of aliphatic monocarboxylic acids, aliphatic dicarboxylic acids, aromatic monocarboxylic acids, and aromatic dicarboxylic acids and their esters with monohydric or polyhydric alcohols in such an amount that the antimony pentachloride content is from about 0.01 to 0.2 percent by weight based on the total reaction mixture, and
    (b) using as the promoter acetic anhydride in an amount of from about 1 to 20 mole percent based on the tetrahydrofuran.

2. The process of claim 1, wherein the catalyst is a 1:1 adduct of antimony pentachloride with a monocarboxylic acid or a 2:1 adduct of antimony pentachloride with a dicarboxylic acid.

3. The process of claim 1, wherein the aliphatic monocarboxylic acids are selected from the group consisting of valeric acid, trimethylacetic acid, caproic acid, heptylic acid, caprylic acid, pelargonic acid, methyl ethyl caproic acid, formic acid, acetic acid, propionic acid and 2-ethylhexanoic acid;
    wherein the aliphatic discarboxylic acids are selected from the group consisting of maleic acid, glutaric acid, adipic acid, oxalic acid and succinic acid;
    wherein the aromatic monocarboxylic and dicarboxylic acids are selected from the group consisting of benzoic acid, terephthalic acid and phthalic acid; and
    wherein the alcohols are selected from the group consisting of methanol, ethanol and 1,4-butanediol.

4. The process of claim 1, 2 or 3, further comprising the steps of stopping the polymerization by adding an agent selected from the group consisting of water, an alcohol selected from the group consisting of methanol, ethanol and butanol, or a basic compound selected from the group consisting of sodium carbonate, calcium hydroxide, potassium bicarbonate and sodium hydroxide; and then removing the catalyst.

5. The process of claim 4, wherein the polymerization is stopped by adding calcium hydroxide.

* * * * *